United States Patent
Wynne

[11] 4,076,038
[45] Feb. 28, 1978

[54] TAPPING TEE CUTTER HAVING RELIEVED SIDEWALL

[75] Inventor: Ralph A. Wynne, Dallas, Tex.

[73] Assignee: Phillips Petroleum Company, Bartlesville, Okla.

[21] Appl. No.: 646,469

[22] Filed: Jan. 5, 1976

[51] Int. Cl.² .............................................. B23B 41/08
[52] U.S. Cl. ..................................... 137/318; 408/204
[58] Field of Search ............... 137/317, 318; 408/199, 408/207, 211, 204

[56] References Cited

U.S. PATENT DOCUMENTS

| | | | |
|---|---|---|---|
| 3,240,226 | 3/1966 | Burkholder | 137/318 |
| 3,349,792 | 10/1967 | Larkin | 137/318 |
| 3,617,145 | 11/1971 | Celmer et al. | 137/318 |
| 3,756,261 | 9/1973 | Minchhoff | 137/318 |
| 3,771,546 | 11/1973 | Roos | 137/318 |

*Primary Examiner*—Martin P. Schwadron
*Assistant Examiner*—G. L. Walton

[57] ABSTRACT

A tapping tee cutter for cutting plastic pipe is provided which comprises an externally threaded plug body attached to a thin-walled, hollow band cutter having a cutting edge with the portion of the band wall nearest the cutting edge having an external diameter at least as great as the cutting edge and forming a shoulder with an adjacent portion of the band cutter wall having a relieved external diameter sufficiently less than the diameter of the cutting edge so that frictional contact between the relieved diameter and a pipe wall being tapped is minimized.

11 Claims, 3 Drawing Figures

TAPPING TEE CUTTER HAVING RELIEVED SIDEWALL

BACKGROUND OF THE INVENTION

This invention relates to service tees for tapping plastic pipe. In one of its aspects this invention relates to cutters used in conjunction with tapping tees. In another of its aspects this invention relates to minimizing frictional contact between the external diameter of the cutting plug and the plastic pipe being tapped.

Plastic piping has come into wide usage as a replacement for metal piping. In most instances the combination of strength and flexibility of the plastic pipe makes this material equal to or better than metal piping for many uses. One of the drawbacks in using plastic pipe for such services as water and gas mains is the problem of tapping into a plastic pipe while the piping is in service.

Many designs for tapping tee cutters for plastic pipe have been presented, but the majority of these suffer from a disability of requiring application of pressure to preform the cutting operation that is also sufficient to cause deforming of the wall of the plastic pipe that is being cut. The deforming of the wall of the pipe causes the cuts to be sufficiently out of true to permit problems of leakage after the cut is made and the pipe has returned to its true shape against the sadle of the tapping tee.

I have discovered that by minimizing the friction between the external wall of a tapping cutter and the wall of the plastic pipe as the cutter passes through the wall of the pipe that the problem of deforming the wall of the pipe is substantially lessened.

It is therefore an object of this invention to provide a cutter for a tapping tee minimizing frictional contact between the external wall of the cutter and the wall of the plastic pipe through which the cutter is being moved. It is another object of this invention to reduce the probability of deforming plastic pipe during the cutting operation.

Other aspects, objects and the various advantages of this invention will become apparent from a study of the disclosure, the drawing, and the appended claims.

STATEMENT OF THE INVENTION

In accordance with this invention a cutter for a tapping tee for cutting plastic pipe is provided. The cutter terminates in a cutting edge and has the sidewall nearest the cutting edge of an external diameter at least equal to the diameter of the cutting edge forming a shoulder with an adjacent portion of the cutter wall having a relieved external diameter sufficiently less than the diameter of the cutting edge to minimize frictional contact between the relief diameter and a pipe wall being tapped.

In a preferred embodiment of the invention the tapping tee cutter is a thin-walled, hollow, cylindrical band cutter that extends at its end opposite the cutting edge from a cylindrical, co-axial, externally threaded plug body member for rotative movement in a through-bore of a tapping tee thereby forming a tapping plug.

In another embodiment of the invention a tapping tee is provided in conjunction with a tapping plug. The tapping tee, as a minimum, is composed of a tube firmly affixable and mateable with the exterior of the plastic pipe be tapped and having an internal bore threaded to mate with the externally threaded plug body of the tapping plug. Many variations of design for tapping tees are already known which include both simple pipes shaped to be adhered to the external wall of a plastic pipe and tubes fixed into saddles with the saddles shaped to conform to the external diameter of plastic pipe.

The essential feature of my tapping tee cutter is the externally relieved diameter portion of the cutter wall which forms a shoulder with the portion of the cutter wall nearest the cutting edge so that as the cutting edge is pushed through the wall of the plastic pipe the external surface of the body of the cutter presents minimal contact with the cut wall surface of the plastic pipe. The length of external wall of diameter greater than the relieved diameter of the cutter wall should be the shortest length practicable to provide rigid support for the cutting edge. One of the major objects of the invention is to minimize the contact of the cut wall of the plastic pipe with the external diameter of the tapping tee cutter.

In accordance with the invention the diameter of the cutting edge may be the same as the major external diameter of the cutter wall or the major external diameter of the cutter wall may be beveled inward to form a cutting edge. The relieved diameter of the external wall of the cutter is less than the diameter of the cutting edge. The difference in the diameter of the cutting edge and the relieved external diameter of the cutter wall need only be sufficient to minimize friction between the relieved external diameter surface and the cut wall of piping tapped. It can easily be seen that a hollow cylinder-shaped cutter of this invention must have a cutting edge beveled from the internal diameter so that a cutting edge can be formed by the external wall of the cutter and the internal bevel or there may also be a bevel from the external diameter of the cutter wall so that a cutting edge is formed by a double bevel. The depth of the shoulder formed between the external relieved diameter of the cutter wall and the external major diameter of the cutter wall is determined by the amount of bevel from the external diameter wall used to produce a cutting edge.

The invention can best be understood from a description read in conjunction with the accompanying drawing in which.

Figure 1:
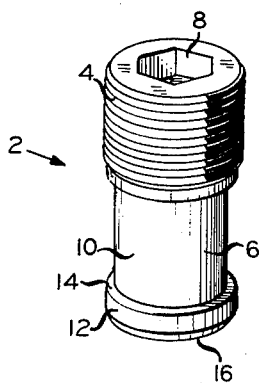
FIG. 1 is a perspective view of an assembled tapping plug of this invention.

Referring now to FIG. 1, a tapping plug 2 of this invention is shown in perspective view. The plug is a cylindrical, externally threaded plug body member 4 and a thin-walled, hollow cylindrical band cutter member 6.

The plug body 4 is shown with an indentation 8 into which a tool can be inserted for turning the tapping plug within the tapping tee. The plug body can be made of any suitable material but will usually be made of a resilient, hard plastic material such as nylon. The plug body 4 and band cutter member 6 can be made in one piece from steel if desired.

The cutter member 6 is illustrated with a relieved external diameter portion 10 abutting a major external diameter portion 12 forming a shoulder 14. The major external diameter portion 12 is, of course, of less diameter than the internal diameter of the threads of the externally threaded plug body 4 so that the largest portion of the cutter member is of less diameter than the smallest diameter of the plug portion threads. The exposed end of the cutter band is beveled to form a cutting edge 16.

Figure 2:
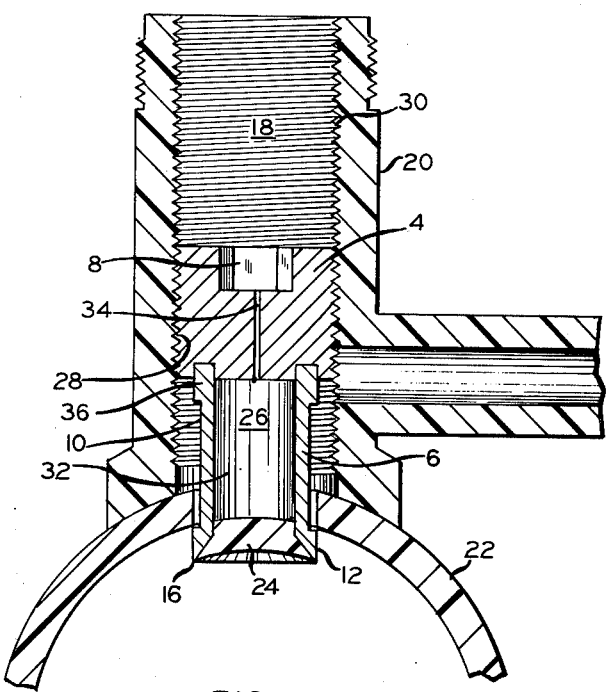
FIG. 2 is an elevational view in cross section of a tapping plug of this invention in position in a tapping tee on a plastic pipe.

Referring now to FIG. 2 a tapping plug similar to that of FIG. 1 is shown in cross section with the tapping plug movable by rotative movement through the through-bore 18 of a tapping tee 20 attached to the outer surface of a plastic pipe 27 so that the cutting edge 16 of the band cutter 6 passes through the pipe wall cutting a coupon 24 from the pipe wall and retains this coupon within the hollow center 26 of the cutter element 6. To attain this position the threaded plug body 4 which has external threads 28 which match the internal threads 30 of the through-bore 18 of the tapping tee 20 is moved through the tapping tee by rotative movement using a tool that fits the geometric depression 8 (here a hexagonal prism).

As the cutting edge 16 contacts the outer surfce of the pipe 22 the pipe is forced around the portion of the cutting member between the external major diameter 12 and the internal diameter 32 of the cutting element. As the cutting element is forced deeper into the pipe the coupon 24 is forced into the space within the hollow internal diameter 32 of the cutting element. A vent hole 34 through the threaded plug body connecting the hollow interior of the outer element with the opposite external surface of the plug body 4 allows greater ease in retaining the coupon by relieving pressure that could be caused by the compression of air within a closed chamber 26. As the cutting edge 16 (here shown at the external major diameter 12) passes through the pipe wall 22 the cut surface adjacent to the external major diameter which has been compressed in the cutting can expand into the relieved portion 10 of the cutter element which by appropriate sizing of the relieved external diameter can allow sufficient room to minimize the friction between the cutter element and the cut wall of the plastic pipe.

Figure 3:
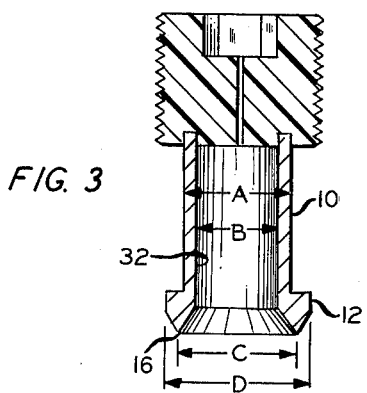
FIG. 3 is an elevational view in cross section of a preferred embodiment of the tapping plug of this invention.

Referring now to FIG. 3 the preferred embodiments of the cutting element of this invention are shown. It can be seen by comparing FIG. 1 with FIG. 2 that the external relief diameter portion 10 of the cutter element 6 can extend for the length of the cutter element with the exception of the short portion near the cutter element 16 or a shoulder of greater diameter 36 (in FIG. 2) can be present at the end connected into the threaded plug body 4.

FIG. 3 shows the preferred relationship between the diameter of the cutting edge 16, here denominated C, the diameter of the major external diameter portion 12, here denominated D; the internal diameter 32 of the cutter portion, here denominated B and the diameter of the external relief portion 10, here denominated A. While the external major diameter D can be the same as the cutting edge diameter C, it is preferred that C be less than D with the cutting edge 16 being formed by a bevel on both the internal and external sides of the cutting element. The external relief diameter A must always be sufficiently less than C to allow expansion of the cut plastic pipe after the plastic pipe has been severed by the cutting edge, particularly if the plastic has been disrupted by being passed over an external major diameter D greater than the diameter of the cutting edge C. The external relief diameter A must always be less than the diameter of the cutting edge C.

In the most preferred embodiment of this invention the cutting edge diameter C is less than one-half the difference between the external major diameter D and the internal diameter B of the cutting element. It has been found that this arrangement causes less deforming of the plastic pipe during the cutting operation than other configurations tried.

I claim:

1. A cutter for a tapping tee for cutting plastic pipe comprising:
   a. a band cutter terminating in a cutting edge, said cutter having a portion of the cutter wall near the cutting edge of an external diameter at least equal to the diameter of the cutting edge and forming a shoulder with an adjacent portion of the cutter wall, said adjacent portion of the cutter wall having a relieved external diameter sufficiently less than the diameter of the cutting edge to minimize the frictional contact between the relief diameter and the cut wall of a pipe being tapped.

2. A cutter of claim 1 wherein said cutter is a thin-walled, hollow, cylindrical band cutter that extends from its end opposite the cutting edge from a cylindrical, co-axial, externally threaded plug body member attached for rotative movement in a through-bore of a tapping tee.

3. A cutter of claim 2 wherein said threaded plug body member is indented with a geometric depression suitable for the insertion of a tool for turning the tapping plug within a tapping tee.

4. A cutter of claim 2 wherein said threaded plug body member has a vent hole passing therethrough connecting the space within the hollow internal diameter of the cutter with the opposite external surface of the threaded plug body.

5. A cutter of claim 2 wherein said cutting edge is the same diameter as the external diameter of the cutter.

6. A cutter of claim 2 wherein the diameter of the cutting edge is less than the external diameter of the cutter.

7. A cutter of claim 6 wherein the cutting edge diameter is less than one-half the difference between the external major diameter of the cutter and the internal diameter of the cutter.

8. In combination a service tee for tapping plastic pipe with an internally threaded through-bore fitted with a cutter of claim 1.

9. In combination a service tee for tapping plastic pipe with an internally threaded through-bore fitted with a cutter of claim 2.

10. In combination a service tee for tapping plastic pipe with an internally threaded through-bore fitted with a cutter of claim 6.

11. In combination a service tee for tapping plastic pipe with an internally threaded through-bore fitted with a cutter of claim 7.

* * * * *